Figure 1:
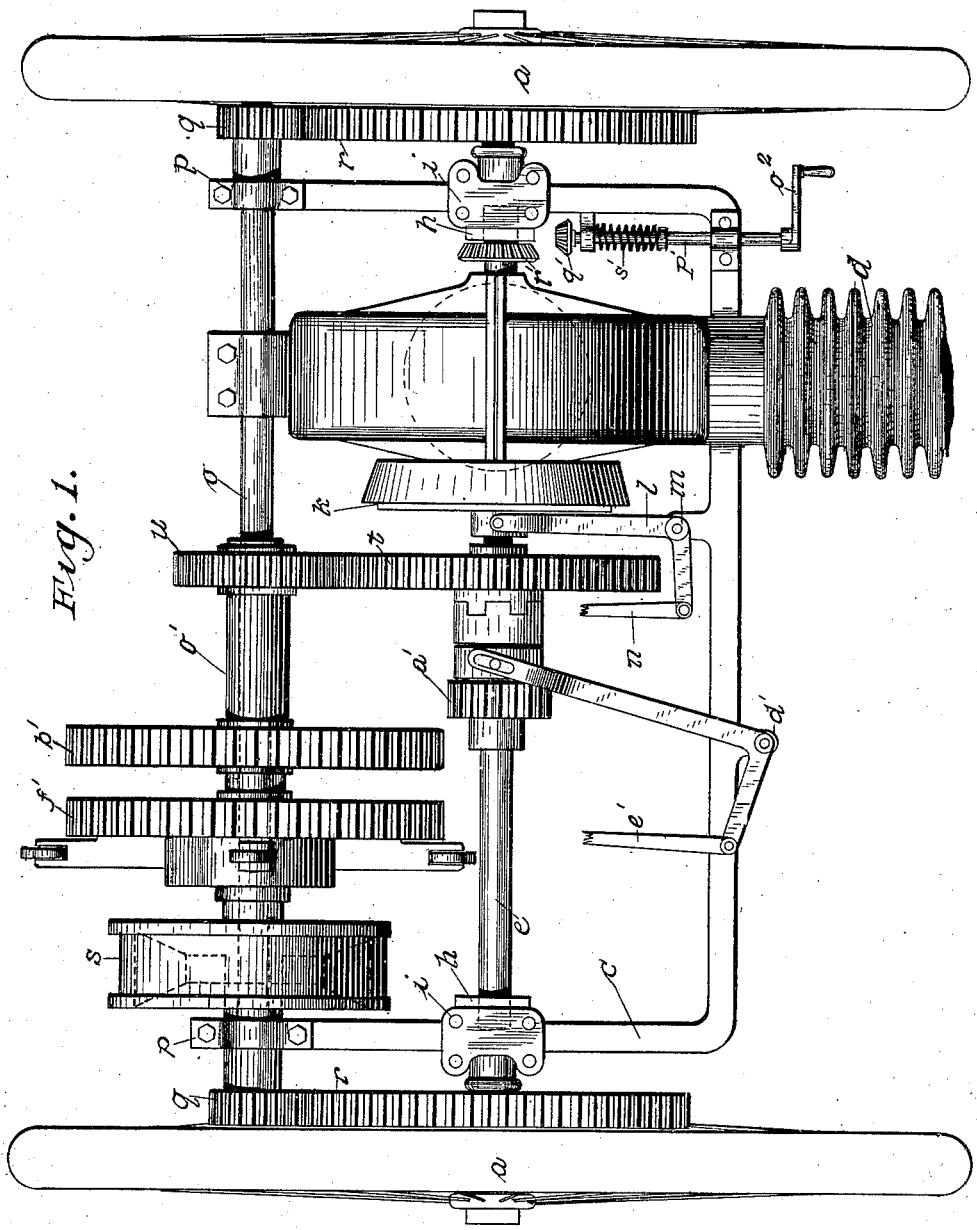

No. 662,401. Patented Nov. 27, 1900.
L. H. DYER.
GEARING FOR AUTOMOBILE VEHICLES.
(Application filed Apr. 26, 1899.)

(No Model.) 3 Sheets—Sheet 1.

Witnesses
F. S. Howell
Harry M. Test

Inventor
Leonard Huntun Dyer

No. 662,401. Patented Nov. 27, 1900.
L. H. DYER.
GEARING FOR AUTOMOBILE VEHICLES.
(Application filed Apr. 26, 1899.)
(No Model.) 3 Sheets—Sheet 2.
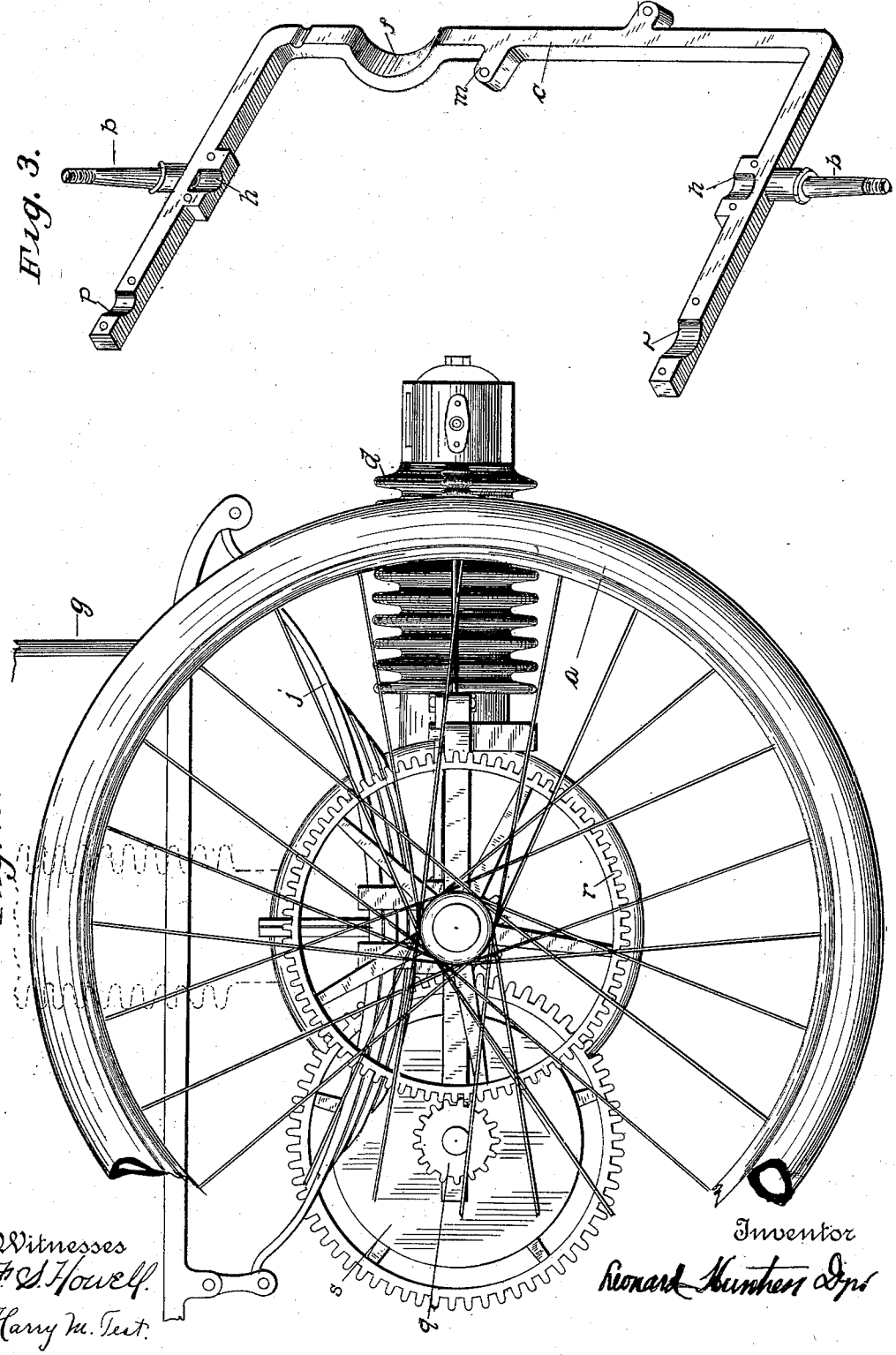
Witnesses
F. S. Howell
Harry M. Test
Inventor
Leonard Hunter Dyer No. 662,401.  
L. H. DYER.  
GEARING FOR AUTOMOBILE VEHICLES.  
(Application filed Apr. 26, 1899.)  
(No Model.)  
Patented Nov. 27, 1900.  
3 Sheets—Sheet 3.
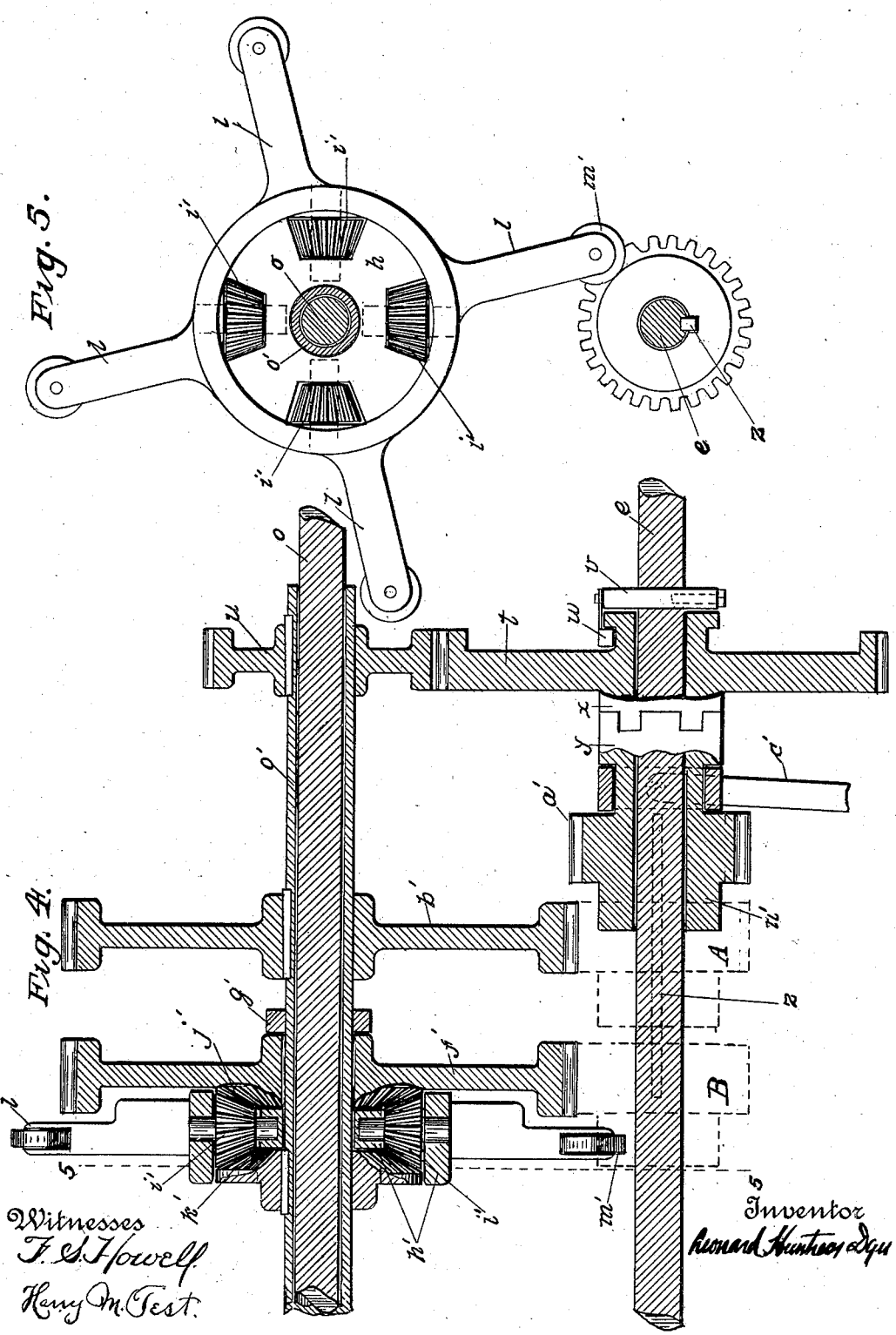

UNITED STATES PATENT OFFICE.

LEONARD HUNTRESS DYER, OF WASHINGTON, DISTRICT OF COLUMBIA, ASSIGNOR OF ONE-FOURTH TO FRANK L. DYER, OF MONTCLAIR, NEW JERSEY.

GEARING FOR AUTOMOBILE VEHICLES.

SPECIFICATION forming part of Letters Patent No. 662,401, dated November 27, 1900.

Application filed April 26, 1899. Serial No. 714,514. (No model.)

*To all whom it may concern:*

Be it known that I, LEONARD HUNTRESS DYER, a citizen of the United States of America, residing in the city of Washington, in the District of Columbia, have invented new and useful Improvements in Gearing for Automobile Vehicles, of which the following is a specification, reference being had to the accompanying drawings, forming a part thereof.

My invention relates to improvements in gearing for automobile vehicles wherein a gas, steam, or other motor is employed to drive the same.

My invention particularly relates to the gearing for transmitting motion from the motor to the driving-wheels, whereby two or more speeds in either direction may be secured independently of the speed and direction of rotation of the motor.

Broadly considered, my invention consists in providing and suitably mounting a counter-shaft parallel to the engine-shaft and providing connecting-gears between the two shafts, whereby the counter-shaft may run at any desirable speed or in either direction and the wheels will be driven in the proper direction.

The gearing consists generally in providing two gears with comparatively fine teeth and constantly in mesh, one keyed permanently to the counter-shaft and the other temporarily keyed to its shaft by means of a clutch or sliding key. In conjunction with the two gears are arranged another pair of gears of different proportions from the first-mentioned gears. One of these gears, preferably the larger, is permanently keyed to the counter-shaft. The other gear is adapted to slide along the engine-shaft, but to be rotated therewith by means of a fixed key or feather. Means are provided for shifting this gear and allowing it to engage or disengage with its companion gear. The clutch or key which connects the movable fine-toothed gear to the engine-shaft is combined with the shifting-pinion, so that when the clutch is applied the shifting-pinion will be disengaged from its companion gear; but upon the clutch being released the shifting-gear will intermesh with its companion gear and cause the counter-shaft to be driven at a lower speed. This form of gearing possesses many advantages when applied to automobile vehicles. In actual operation universally wherein two different sets of gears are employed the higher set is normally used. The low-speed gear is used but a short time while starting the vehicle, but after the latter is under way the high-speed gear is used. The low-speed gear is also used in climbing steep hills and in running over heavy ground. In use in towns where the pavements are good and the hills not steep the high-speed gear is almost exclusively used. Any diminution of speed is made by reducing the speed of the motor or allowing the friction-clutch to slip.

The particular advantage of my gear consists in providing a high-speed gear consisting of gears with fine teeth, which are permanently in mesh and can be very nicely fitted. The low-speed gear being so rarely used can be formed of wheels provided with teeth which will loosely intermesh to allow them to be easily shifted. As the low-speed gear is usually disengaged and the parts entirely separate there will be no noise caused thereby.

That portion of my invention which relates to the reversing-gear I also consider novel and of great importance. It consists generally in providing a gear of the same diameter and pitch as the low-speed gear and in mounting the same loosely upon the counter-shaft. Alongside of this gear on the same shaft is mounted a spider-frame carrying a plurality of bevel-pinions which engage with a bevel-gear fastened to one side of the large gear and to a corresponding bevel-gear keyed to the counter-shaft. The sliding pinion on the engine-shaft is arranged to engage with the large gear of the reversing-gear, and at the same time means are provided for arresting the motion of the spider-frame. The axles of the small pinion will then be held stationary, while the pinions will rotate upon a fixed plane and cause the bevel-gear which is keyed to the counter-shaft to rotate in the opposite direction from the bevel-gear which is keyed to the large gear. The particular advantage of this reversing-gear consists in the fact that while not in use all of its parts will rotate with the counter-shaft without any of its separate members moving in relation to each other, and consequently there will be no friction and no resulting noise when this device is not in use.

In order to better comprehend the nature of my invention, attention is directed to the accompanying drawings, in which—

Figure 1 is the top view of the supporting-wheels, connecting-axle, engine, and gears of an automobile vehicle with my improved gearing attached. Fig. 2 is a side view of the same, including the supporting-springs and part of the carriage-body. Fig. 3 is an isometrical view of the main axle. Fig. 4 is an enlarged sectional view of the connecting-gears, and Fig. 5 is a section taken through the lines 5 5 of Fig. 4.

In all the several views like parts are designated by the same letters of reference.

Referring to Figs. 1 and 3, it will be seen that the drive-wheels $a$ $a$ are independently mounted upon the stubs $b$. The latter are permanently attached to or formed integrally with the axle $c$. The latter is U-shaped, as shown, so as to provide a clear space between the stubs $b$ $b$. The motor $d$ is attached to the axle $c$ in such a manner as to allow its shaft $e$ to run practically in line with the stubs $b$ $b$ and the centers of the wheels $a$ $a$.

As shown in the drawings, the motor $b$ is horizontally arranged and lies within a small offset or depression $f$ in the axle $c$. If it is desired, the motor may be arranged with its cylinder in a vertical position, as shown in the broken lines in Figs. 1 and 2. In this case some provision should be made to allow the motor to pass up through the bottom of the carriage-body $g$.

The driving-shaft $e$ is supported within boxes $h$ $h$, formed adjacent to the stubs $b$ $b$. Attached adjacent to these boxes or, as shown in the drawings, formed integrally with these boxes are the shoes $i$ $i$, to which the supporting-springs $j$ $j$ are attached. The latter are connected directly to the body $g$.

The motor-shaft $e$ is connected to the motor by means of a friction-clutch $k$, the moving part of which slides on the shaft and rotates therewith by means of a feather. The clutch is operated by means of a bell-crank lever $l$, pivoted at $m$ to the axle $c$. A rod $n$ leads to a pedal or lever located within convenient reach of the operator.

The counter-shaft $o$ is supported in bearings $p$ $p$, located upon the extremities of the axle $c$. The extremities of the counter-shaft $o$ carry pinions which mesh in the gears $r$ $r$, which are secured to the drive-wheels $a$. In order that the drive-wheels $a$ $a$ may be turned at different relative speeds when the vehicle is turned, the differential or jack-in-the-box $s$ is provided. The construction of the differential is well known and need not be described. Its casing, however, serves as a convenient means for the application of a brake, the manner of attachment of which is obvious.

Referring to Fig. 4, $t$ is a gear which freely turns upon the shaft $e$ and is constantly in mesh with the gear $u$, which is fastened to the sleeve $o'$. These gears are made with fine teeth, and, if desired, one of them may be of composition fiber or rawhide. The gear $t$ is kept in position by means of the collar $v$ and guide $w$. One face of the gear $t$ is provided with one member of a jaw-clutch $x$. The other member $y$ of the clutch freely slides upon the shaft $e$, but rotates therewith by engaging with the feather or spline $z$. Attached to and rotating with the sliding member of the clutch is a small coarse-toothed pinion $a'$. The latter is so arranged that when the two portions of the clutch are separated it will engage with the large gear $b'$, which is keyed to the sleeve $o'$, which connects with the shaft $o$ by means of the jack-in-the-box, as is common. A lever $c'$, pivoted at $d'$ to the axle $c$, is provided for shifting the clutch member and pinion. A rod $e'$ leads to within convenient reach of the operator.

As shown in Fig. 4, the two members of the clutch are engaged, and consequently the gear $t$ will rotate with the shaft $e$ and impart motion to the counter-shaft $o$ at a high rate of speed. Upon the shifting of the parts to the position A (shown in dotted lines) the gear $a'$ will engage with the gear $b'$ and the clutch member $y$ will be separated from the clutch member $x$. This will free the gear $t$ and allow the same to turn loosely on the shaft $e$. At the same time the gears $a'$ and $b'$ becoming intermeshed will cause the shaft $o$ to rotate at a slower rate of speed.

The reversing-gear will now be described. A gear of the same size and pitch as the gear $b'$ is provided at $f'$. This gear is loosely mounted upon the sleeve $o'$ and is kept in position by means of the collar $g'$. Mounted loosely upon the sleeve $o'$, adjacent to the gear $f'$, is a spider-frame $h'$, carrying therein a plurality of bevel-pinions $i'$. The latter engage upon one side with the bevel-gear $j'$, attached to and rotating with the gear $f'$, and upon the other side with the corresponding bevel-gear $k'$, which surrounds and is fastened to the sleeve $o'$. The latter is secured to the shaft $o$ by means of the jack-in-the-box.

It will be seen as the parts are now described they will all rotate in the same direction, together with the counter-shaft $o$. If the gear $a'$ be moved to the position B, (shown in broken lines,) it will engage with the gear $f'$ and rotate the same in one direction. If at the same time the spider-frame $h'$ be kept from revolving, the pinions $i'$ will rotate upon their axes by engaging with the gears $j'$ and $k'$. As the gear $j'$ is rotated in the same direction as the gear $f'$ the gear $k'$ must necessarily rotate in the opposite direction. As the latter is fastened to the sleeve $o'$ the gear consistency required to render it congealable by subjecting it to a sufficiently low temperature; then subjecting the solution to a suitable temperature lower than 50° Fahrenheit, and when the solution has congealed into a sliceable state then converting the congealed mass into thin slices, and lastly drying the resulting slices at the aforesaid temperature, substantially as and for the purpose set forth.

Signed by me at Cleveland, Ohio, this 23d day of October, 1899.

EUGENE R. EDSON.

Witnesses:
 C. H. DORER,
 A. H. PARRATT.